United States Patent Office 3,681,064
Patented Aug. 1, 1972

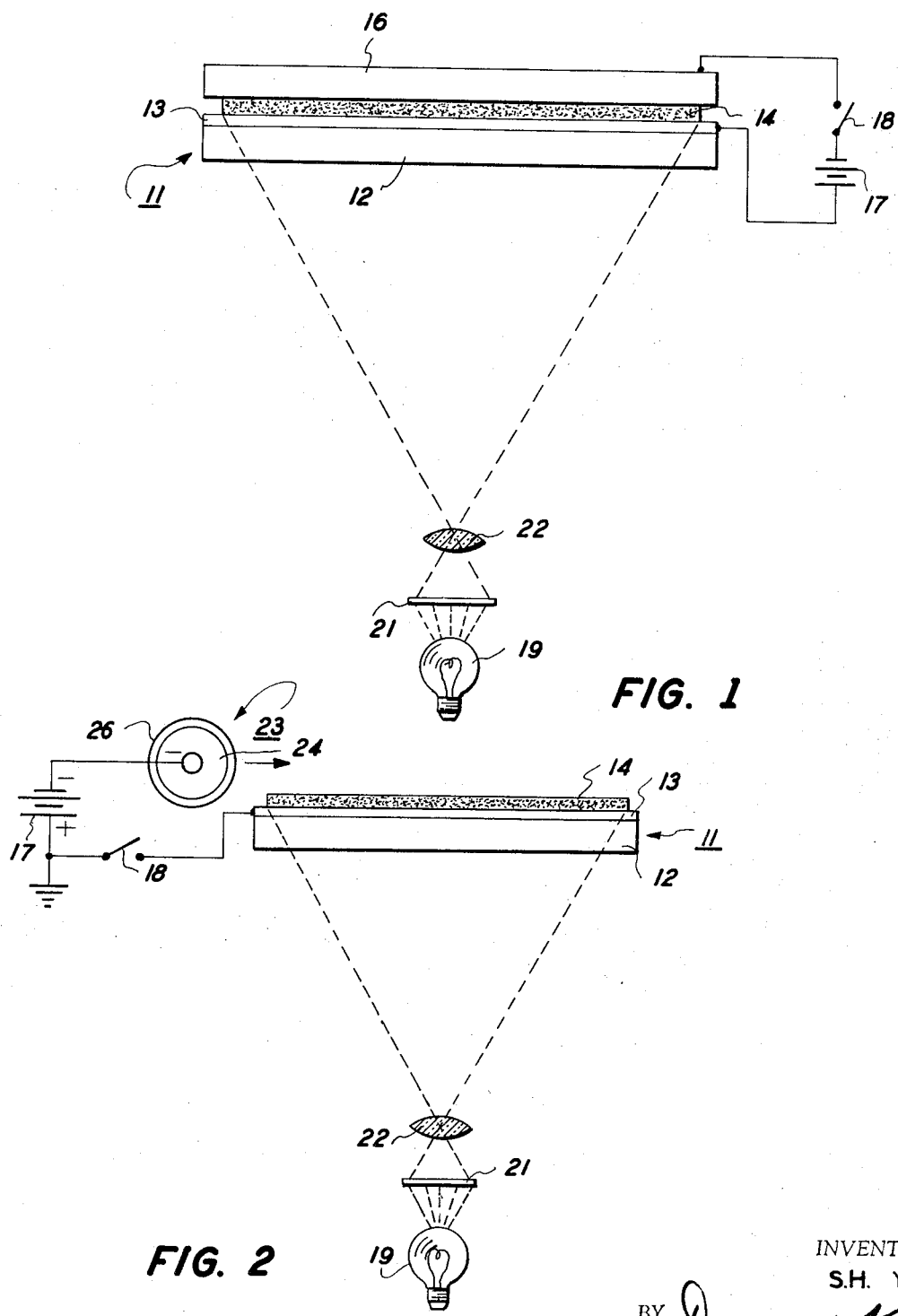

3,681,064
PHOTOELECTROPHORETIC IMAGING PROCESS EMPLOYING MULTICOMPONENT ELECTRICALLY PHOTOSENSITIVE PARTICLES
Shu-Hsiung Yeh, Iowa City, Iowa, assignor to Xerox Corporation, Stamford, Conn.
Continuation-in-part of application Ser. No. 748,884, May 6, 1968, which is a division of application Ser. No. 518,041, Jan. 3, 1966, now Patent No. 3,383,993, which in turn is a continuation-in-part of application Ser. No. 384,680, July 23, 1964, now abandoned. This application Feb. 3, 1971, Ser. No. 112,367
Int. Cl. G03g 13/22
U.S. Cl. 96—1 R    6 Claims

ABSTRACT OF THE DISCLOSURE

A photoelectrophoretic imaging system is described which includes at least two electrodes, at least one of which is at least partially transparent. A thin layer of a suspension of particles in a liquid carrier is interpositioned between the electrodes. At least one of the electrodes has a blocking surface facing the suspension. Means are included to impose an electric field across the suspension between the electrodes and to expose the suspension to an image with electromagnetic radiation through the transparent electrode. This apparatus is suitable for preparing both monochromatic and polychromatic copies of originals by particle migration through the suspension.

Figure 3A:
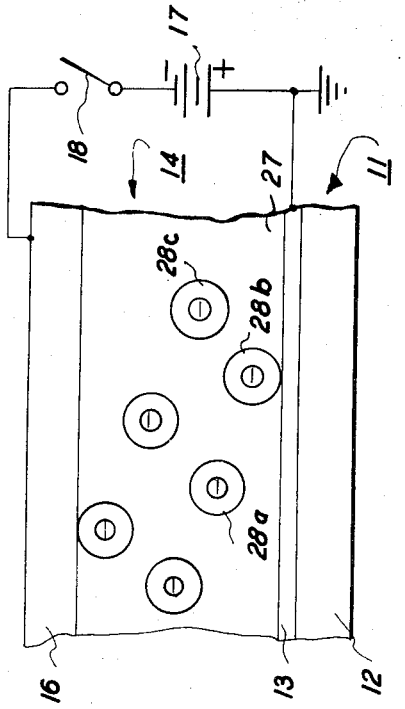
Figure 3B:
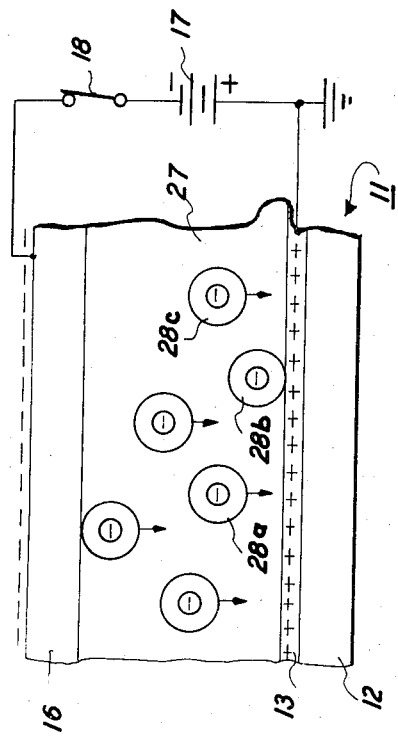

This invention relates to an imaging system and more specifically to a photoelectrophoretic imaging system. This application is a continuation-in-part of copending application Ser. No. 748,884 filed May 6, 1968, now abandoned which in turn is a division of application Ser. No. 518,041 now U.S. Pat. No. 3,383,993 which in turn was filed as a continuation-in-part of application Ser. No. 384,680, filed July 23, 1964, now abandoned.

Although many photographic systems are known today, such as, for example, processes based on photolytic reduction of silver salts or chromate compounds, photolysis of the ferric ion to the ferrous ion, the use of phototropic compounds, the diazo coupling reaction, various thermographic techniques, photobleaching of dyes, photopolymerization, etc., all of the known systems or photography suffer from one shortcoming or another. For example, some require expensive and complex initial preparation of the photosensitive media while others suffer from deficiencies in resolution capabilities, photographic speeds, spectral sensitivity and the like. In addition to the aforementioned shortcomings of many of the present-day photographic systems, additional processing is generally required to produce a visible image from the latent image produced in the photosensitive media after its exposure to light. In a silver halide system, for example, this generally requires developing and fixing of the negatives, printing the negative on a printing paper followed by developing, fixing and drying of the positive print.

Although imaging systems based on particle migration techniques have been suggested in the prior art as described, for example, in U.S. Pat. 2,940,847 to Kaprelian, these systems have proven so light insensitive, produce such poor images and are so complex and difficult to manufacture that they have never been accepted commercially. These prior art systems employ complex particles including at least two and frequently more layers of various different materials including, for example, photoconductive cores with varying high resistivity light filtering overcoatings and sometimes include glass cores, encapsulated dyes and similar components. It has, however, been discovered quite unexpectedly and surprisingly in accordance with the present invention that if one of the electrodes employed is a blocking electrode any suitable photosensitive particle may be used to produce excellent results under the conditions described hereinafter, whether or not the particles include two or more layers of the type described in the prior art.

It is therefore, an object of this invention to provide an imaging system capable of overcoming the above noted disadvantages.

A further objective of this invention is to define a novel imaging system capable of direct positive imaging.

Still another objective of the invention is to define a novel imaging system for producing images in one or more colors.

Yet, still a further object of this invention is to provide a novel photoelectrophoretic imaging process.

It has been determined in accordance with the present invention, that when one or more types of photosensitive radiant energy absorbing particles, as hereinafter described, are suspended in a liquid carrier, placed in an electroded system employing a blocking electrode and exposed to an image that a reproduction of the latter may be obtained. When these steps are completed, particles migration takes place in image configuration providing a visible image at one or both of the electrodes. The system employs particles which are photosensitive and which apparently undergo a net change in charge polarity upon exposure to activating radiation, by interaction with one of the electrodes. No other photosensitive elements or materials are required, making for a very simple and inexpensive imaging technique. Mixtures of two or more differently colored particles are used to secure various colors of images and imaging mixes having different spectral responses. Particles in these mixes may have either separate or overlapping spectral response curve and may even be used in subtractive color synthesis.

This invention is described in the following discussion of the invention taken in conjunction with the accompanying drawings wherein:

FIGS. 1 and 2 are side views of simple exemplary systems for carrying out the steps of the invention; and FIGS. 3a, 3b, 3c, and 3d represent in diagrammatic views a theoretical discussion of the apparent mechanism which takes place during the operation of the imaging process.

The sizes and shapes of elements of the drawings should not be considered as actual sizes or even proportional to actual sizes because many elements have been purposely distorted in size or shape in order to more clearly describe the invention.

Referring now to FIG. 1, there is seen a transparent electrode generally designated 11 which, in this exemplary instance, is made up of a layer of optically transparent glass 12 overcoated with a thin optically transparent layer 13 of tin oxide commercially available under the name NESA glass. This electrode shall hereafter be referred to as the injecting electrode. Coated on the surface of injecting electrode 11 is a thin layer of a liquid suspension 14 comprising finely divided photosensitive particles dispersed in an insulating carrier liquid. The term "photosensitive" may be defined as applying to any particle which, once attracted to the injecting electrode will migrate away from it under the influence of an applied electric field when it is exposed to actinic electromagnetic radiation; however, a detailed theoretical explanation of the apparent mechanism of operation of the invention and the "photosensitive" nature of the particles is given below. The liquid suspension 14 may also contain a binder for the particles which is at least partially soluble in the suspending carrier liquid and/or a sensitizer, as will be explained in greater detail hereinafter. Above the liquid suspension 14 is a blocking electrode 16 which is connected to one side of the potential source 17 through a switch 18. The opposite side of potential source 17 is connected to the injecting electrode 11 so that when switch 18 is closed, an electric field is applied across the liquid suspension 14 from electrodes 11 and 16. An image projector made up of a light source 19, a transparency 21, and a lens 22 is provided to expose the dispersion 14 to a light image of the original transparency 21 to be reproduced. It should be noted at this point that injecting electrode 11 need not necessarily be optically transparent but that instead, the blocking electrode 16 may be optically transparent and exposure may be made through it from above as seen in FIG. 1.

The embodiment shown in FIG. 2 is the same as the FIG. 1 embodiment except for the fact that electrode 16 is made in the form of a roller 23 having a conductive central core 24 connected to the potential source 17. The core is covered with a layer of a blocking electrode material 26, which may be baryta paper or other materials, as explained hereinafer. In both the FIG. 1 and FIG. 2 embodiments of the invention, the particle suspension is exposed to the image to be reproduced while potential is applied across the blocking and injecting electrodes by closing switch 18. In the FIG. 2 embodiment of the invention, roller 23 is caused to roll across the top surface of injecting electrode 11 with switch 18 closed during the period of image exposure. It is hypothesized that this light exposure causes exposed particles originally attracted to the injecting electrode to migrate through the liquid and adhere to the surface of the blocking electrode, leaving behind a particle image on the injecting electrode surface which is a duplicate of the original transparency 21. The injecting electrode may then be removed from the surface of the suspension whereupon the relatively volatile carrier liquid evaporates off leaving behind the particle image. This particle image may then be fixed in place, as for example, by placing a lamination over its top surface or by virtue of a dissolved binder material in the carrier liquid such as paraffin wax or other suitable binders that come out of solution as the carrier liquid evaporates. Three to six percent by weight of paraffin binder in the carrier has been found to produce good fixing. The carrier liquid itself may be molten paraffin wax or other suitable binder in a liquid state which is self-fixing upon cooling to the solid state. In the alternative, the particle image remaining on the injecting electrode may be transferred to another surface and fixed thereon.

FIGS. 3a through 3d show in detail a proposed theoretical operating mechanism for the system with the particle size and carrier liquid thickness greatly exaggerated for purposes of illustration. Since the system has been experimentally shown to be operative, there is, of course, no intention to limit the invention of this theory of operation which is only given in an attempt to explain it. In these figures, like numerals have been used to identify parts of the system which are identical with those in FIGS. 1 and 2. Referring now to FIG. 3a, it is seen that the disperson generally identified as 14 consists of the insulating carrier liquid 27 having charged particles 28a, 28b, 28c, etc. suspended therein. The particles 28 bear a net electrostatic charge when suspended in the carrier liquid 27 which is believed to be related to the electrochemical potential relationship of the particles and liquid. The charges are trapped or bound either within the body of the particles or at their surfaces. The net charge on the particles may be either positive or negative; however, in this instance, an encircled negative charge in each particle has been employed to diagrammatically indicate that trapped negative charge carriers give that particular particle a net negative electrostatic charge. When switch 18 is left in the open condition and no potential is applied across electrodes 11 and 16 in the system as seen in FIG. 3a, the suspended particles 28 merely assume random positions in the liquid carrier 27. However, when switch 18 is closed thereby rendering the conductive surface 13 of electrode 11 positive with respect to the back surface of blocking electrode 16, negatively charged particles within the system tend to move toward electrode 11 while any positively charged particles in the system would move toward blocking electrode 16. The existence of any positively charged particles within the system and their movement therein will temporarily be disregarded so as to facilitate the explanation of the movement of negatively charged particles in the carrier liquid. Since the particles 28 are, in the absence of actinic radiation, nonconductive, they come down into contact with or closely adjacent to injecting electrode 11 and remain in that position under the influence of the applied electric field until they are subjected to exposure to activating electromagnetic radiation. In effect then, these particles are bound at the surface of the injecting electrode 11 until exposure takes place because particles 28 are sufficiently nonconductive in the suspension in their unexposed condition to prevent the injection of positive charge from the surface 13 of the electrode 11 into them. Particles bound on the surface 13 make up the potential imaging particles for the final image to be reproduced thereon.

Figure 3C:
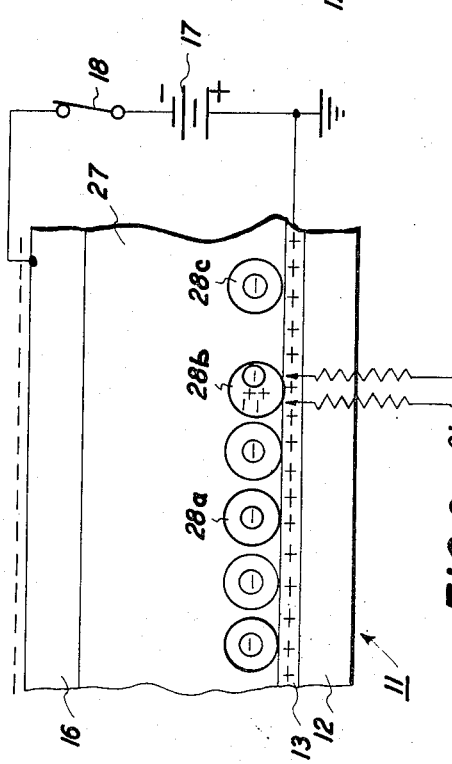
Figure 3D:
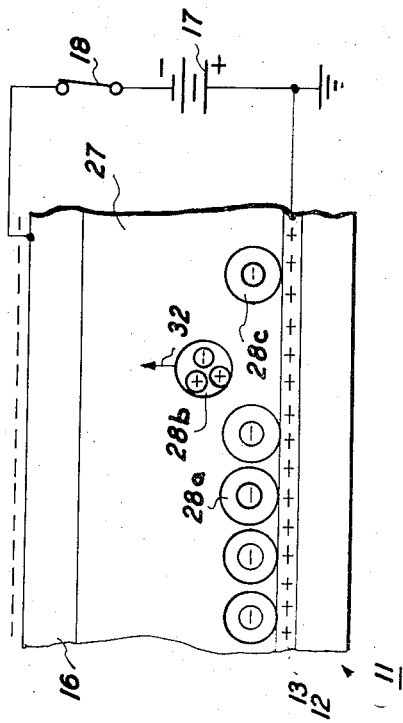

When photons of light such as 31 in FIG. 3c are produced as, for example, by the projector which exposes the system to the image being reproduced, they are absorbed by the photo-sensitive particle 28b and "create" hole-electron pairs of charge carriers within the particle by raising them to a conductive energy band. Since the charge carriers are newly formed by the photons of light 31, as shown in FIG. 3c, they have not had a chance to become trapped in charge traps within the body of particle 28b as was the encircled negative charge carrier. Accordingly, these newly formed charge carriers may be considered as mobile in nature and have been represented by unencircled plus and minus signs. Since an electric field is applied across the particles by the potential applied across blocking electrode 16 and conductive surface 13 of electrode 11, the hole-electron pairs created within these particles are caused to separate before they can recombine, with negative charge carriers moving towards surface 13 while positive charge carrieirs move up toward electrode 16. Since the charge carriers as initially formed are in a mobile condition, the negative charge carriers near the particle-electrode interface can move across the very short distance out of the particle 28b to the surface 13 as indicated by the small arrow, leaving the particle with a net positive charge after sufficient charge transfer. Since particle 28b now carries a net positive charge, it is repelled away by the positive surface 13 of electrode 11 and attracted to negative blocking electrode 16, moving as indicated by arrow 32 in FIG. 3d. Accordingly, all particles such as 28b on the surface 13 which are exposed to electromagnetic radiation of a wavelength to which they are sensitive (that is to say a wave-length which will cause the formation of hole-electron pairs within the particles) move away from surface 13 up to the surface of electrode 16, leaving behind those particles such as 28c which are either not exposed at all or not exposed to electro-magnetic radiation to which they are sensitive. Consequently if all particles in the system are sensitive to one wavelength of light or another and the system is exposed to an image with that wavelength of light, a positive image will be formed on the surface of electrode 13 by the subtraction of bound particles from its surface in exposed areas leaving behind bound particles in unexposed areas. The system is also capable of creating a photographically negative image on surface 16 since only particles in exposed areas move up to that surface. As particles such as 28b move up through the liquid carrier 27 from surface 13 towards blocking electrode 16, it is believed that the new charge carriers may enter charge carrier traps and this has been indicated diagrammatically by showing the holes enclosed within circles in FIG. 3d. Accordingly, the particle now contains one trapped electron and two trapped holes giving it a net charge of plus 1.

As should be clear at this point in the disclosure electrodes 11 and 16 should have certain important properties. These are that electrode 11 will preferably be capable of accepting injected electrons from bound particle 28b when it is exposed to light so as to allow for a net change in the charge polarity on the particle and that electrode 16 will be a blocking electrode which is incapable of injecting electrons into particle 28b at more than a very slow rate when it comes into contact with the surface of the electrode 16.

Oviously, if all polarities in the system are reversed, electrode 11 will preferably be capable of accepting injected holes from bound particles upon exposure to light and electrode 16 will be a blocking electrode incapable of injecting holes into the particles at more than a very slow rate when they come into contact with the surface of this elecrode. In its preferred embodiment, electrode 11 may be composed not only of conventional conductive materials such as tin oxide, copper, copper iodide, gold or the like but may also include many semi-conductive materials not ordinarily thought of as conductors, but which are still capable of accepting injected charge carriers of the proper polarity under the influence of the applied field. Even insulating materials may be placed over the surface of the "injecting" electrode and still be operative because charge which leaves the particles initially bound on this surface upon exposure to light can merely move out of the particles and remain on the insulating surface thereby allowing the exposed particles to migrate. However, the use of the more conductive materials is preferred because it allows for cleaner charge separation in that charge leaving the particles upon exposure can move into the underlying surface and away from the particle in which it originated. This also prevents possible charge buildup on the electrode which might tend to diminish the interelectrode field.

On the other hand, in accordance with this invention, the blocking electrode 16 is selected so as to prevent or greatly retard the injection of electrons (or holes, depending upon the initial polarity of charge on the particle) into particle 28b when it reaches the surface of this electrode. Accordingly, the surface of this electrode facing carrier liquid 27 may be either an insulator or a semiconductor which will not allow for the passage of sufficient charge carriers under the influence of the applied field to discharge the particles so that they will remain bound thereon. Even if this blocking electrode will allow for the passage of some charge carriers through it to the particles, it will still be considered to come within the class of blocking materials if it does not allow for the passage of sufficient carriers to recharge the particle to the opposite polarity because even a discharged particle will tend to adhere to this blocking electrode by Van der Waals forces.

The use of this blocking electrode constitutes an important feature of the invention which prevents particle oscillation from one electrode to another and allows for the use of almost any type of photosensitive particles in the system which at the same time substantially improves image quality.

Baryta paper and other suitable materials may be employed to surface the blocking electrode and may be wet on their back surfaces with tap water or coated on these back surfaces with electrically conductive materials. Baryta paper consists of a paper coated with barium sulfate suspended in a gelatin solution.

Although this invention has been described for the most part in connection with a baryta paper blocking electrode, any suitable material having a resistivity of about $10^7$ ohm-cm. or greater may be employed. Typical materials in this resistivity range include cellulose acetate and polyethylene coated paper, cellophane, nitrocellulose, polystyrene, polytetrafluoroethylene, polyvinyl fluoride and polyethylene terephthalate. The terms "blocking electrode" and "injecting electrode" should be understood and interpreted in this context throughout the specification and claims.

As described in greater detail hereinafter, the system may be operated with suspensions of particles which initially take on a net positive charge, or a net negative charge, and even with systems where the particles in suspension apparently take on both polarities of charge.

Although insulating carrier liquids including decane, dodecane, N-tetradecane, molten paraffin, molten Beeswax, Sohio odorless solvent, (a kerosene fraction available from Standard Oil Company of Ohio) and Isopar G (a long chain saturated aliphatic hydrocarbon available from Humble Oil Company of New Jersey) have been used, any suitable insulating liquid may be used. Depending upon the particular use to which the system is to be put, the liquid suspension 14 may contain one, two, three or even more different particles of various colors and having different ranges of spectral response. Thus, for example, in a monochromatic system, the particles included in imaging liquid 14 may be virtually any color in which it is desired to produce the final image such as gray, black, blue, red, yellow, etc. and the particular point or range of its spectral response is relatively immaterial as long as it shows response in some region of the visible spectrum which can be matched by a convenient exposure source. In fact, in a monochromatic system, the particle may vary in response from one with a very narrow response band all the way up to one having panchromatic response. In polychromatic systems, the particles may be selected so that particles of different colors respond to different wavelengths in the visible spectrum, thus following for color separation. It should be noted, however, that this separation of spectral responses of differently colored particles is not required in all instances and in some cases may actually be undesirable. Thus, for example, in a monochromatic black and white system where it is desirable to produce very intense black images, it may be preferred to produce this result by employing two or more differently colored particles in the system, which when combined will produce a black image. In this latter instance, considerable overlap and even coincidence of the spectral response curves of the different pigments may be tolerated and may even be preferred so that all of the pigments employed in the system will respond in a substantially similar way to generally available light sources which are not uniformly panchromatic in their light output. Clearly, if a white light source is used, this overlap is not a requirement.

Regardless of whether the system is employed to reproduce a monochromatic or a polychromatic image, it is desirable to use particles which are relatively small in size because smaller particles produce better and more stable dispersions in the liquid carrier and, in addition, are capable of producing images of higher resolution than would be possible with particles of larger sizes. When the particles are suspended in the liquid carrier, they may take on a net electrostatic charge so that they may be attracted towards one of the electrodes in the system depending upon the polarity of this charge with respect to that of the electrodes. It is not necessary that the particles take on only one polarity of charge but instead the particles may be attracted to both electrodes. Some of the particles in the suspension initially move towards the "injecting" electrode while others move towards the "blocking" electrode with this type of system; however, this particle migration takes place uniformly over the whole area covered by the two electrodes and the effect of imagewise, exposure-induced migration is super-imposed upon it. Clearly then, the apparent bipolarity of the suspensions in no way affects the imaging capability of the system except for the fact that it subtracts some of the particles uniformly from the system before imagewise modulation of the particle migration takes place. In other words, the above behavior causes a portion of the suspended particles to be removed from the system as potential image-formers. The effective subtraction of some of these particles as potential image formers in the system is easily overcome by merely forming an initial suspension of particles containing a sufficiently high particles concentrations so that the system is still capable of producing intense images. It also has been found that with some suspensions of this type either polarity of potential may be applied to the electrodes during imaging. Although some of the photosensitive materials used in this invention may be used in conventional dry imaging modes, it is believed that a different type of photoresponsive mechanism is involved because it has generally been found that spectral response of the materials is much narrower and their sensitivity is much higher when they are used in the liquid carrier structure of this invention.

As stated above, once the particle image is formed on one of the electrodes, it may be fixed thereon as by spraying a binder on it, laminating an overlay on it or by including a binder in solution in the liquid carrier medium. The image may also be transferred from the electrode and fixed on another surface so that the electrode may be reused. Such a transfer step may be carried out by adhesive pickoff with an adhesive tape such as Scotch brand cellophane tape or preferably, by electrodstatic field transfer. Electrostatic transfer may, for example, be carried out by carrying out the imaging procedure described in connection with FIG. 2 and then passing a second roller over the particle mage formed on electrode 11 held at a potential opposite in polarity to that of the first electrode. If the second electrode roller is covered with a baryta paper sleeve, this paper sleeve will pick up the complete image as the electrode rolls over it. In addition the particles may include a component that can be made tacky by the application of heat or a properly selected solvent so that either of these can be used to fix the particle image to the electrode or assist in transferring and fixing the respective image to a transfer member. The percentage of particles in the insulating liquid carrier is not critical, however, for reference purposes, it is noted that from about 2 to about 10% by weight have been tested and produce good results.

Any suitable particle or mixture of particles may be used in carrying out the invention, regardless of whether the particular particle selected is organic, inorganic and is made up of one or more components in solid solution or dispersed one in the other or whether the particles are made up of multiple layers of different materials. Typical particles include those which are made up of only the pure photosensitive material or a sensitized form thereof, solid solutions or dispersions of the photosensitive material in a matrix such as thermoplastic or thermosetting resins, copolymers of photosensitive pigments and organic monomers, multilayers of particles in which the photosensitive material is included in one of the layers and where other layers provide light filtering action in an outer layer or a fusable or solvent softenable core of resin or a core of liquid such as dye or other marking material or a core of one photosensitive material coated with an overlayer of another photosensitive material to achieve broadened spectral response. Other photosensitive structures include solutions, dispersions, or copolymers of one photosensitive material in another with or without other photosensitively inert materials.

Any suitable photosensitive material may be used in the course of the present invention such as set forth in U.S. Pat. No. 3,383,993. Typical photoresponsive organic materials include substituted and unsubstituted organic pigments such as phthalocyanines, for example, copper phthalocyanine; beta form of metal-free phthalocyanine; tetrachlorophthalocyanine; and x-form of metal-free phthalocyanine; quinacridones as for example, 2,9-dimethyl quinacridone; 4,11 - dimethyl quinacridone; 3,10 - dichloro-6,13-dihydro-quinacridone; 2,9 - dimethoxy-6,13-dihydro-quinacridone; and 2,4,9,11 - tetrachloro-quinacridone; anthraquinones such as 1,5-bis-(beta-phenylethylamino) anthraquinone; 1,5-bis-(3′-methoxy-propylamino) anthraquinone; 1,2,5,6 - di (C,C′-diphenyl)-thiazole-anthraquinone; 4-(2′ - hydroxyphenyl-methoxyamino) anthraquinone; triazines such as 2,4 - diaminotriazine; 2,4-di-(1′ - anthraquinonyl-amino) - 6 - (1″ - pyrenyl)-triazine; 2,4,6 tri-(1′,1″,1‴ - pyrenyl)-triazine; azo compounds such as 2,4,6 - tris (N-ethyl-N hydroxy-ethyl-p-aminophenylazo) phloroglucinol; 1,3,5,7 - tetrahydroxy-2,4,6,8 - tetra (N-methyl-N-hydroxy-ethyl-p-amino-phenylazo) naphthalene; 1,3,5 - tri-hydroxy-2,4,6-tri (3′-nitro-N-methyl-N-hydroxy-methyl-4′ - aminophenylazo) benzene; metal salts and lakes of azo dyes such as calcium lake of 6 - bromo-1 (1′-sulfo-2-naphthalazo)-2-naphthol; barium salt of 6-cyanol-1 (1′-sulfo - 2 - naphthalazo)-2-naphthol; calcium lake of 1 - (2′-azonaphthaliene-1′-sulfonic acid)-2-naphthol; calcium lake of 1 - (4′-ethyl-5′-chloroazobenzene - 2′ - sulfonic acid)-2-hydroxy-3-naphthoic acid; and mixtures thereof. Other organic pigments include polyvinylcarbazole; tri-sodium salt of 2-carboxyl phenyl azo (2 - naphthiol - 3,6 - disulfonic acid); N-isopropylcarbazole; 3 - benzylidene amino-carbazole; 3-aminocarbazole; 1-(4′-methyl-5′-chloro-2′-sulfonic acid) azobenzene - 2-hydroxy-3-naphthoic acid; N-2″-pyridyl-8,13-dioxodinaphtha - (2,1-b; 2′,3′-d)-furan-6-carboxamide; 2-amino - 5 - chloro-p-toluene; sulfonic acid and the like. Typical inorganic photosensitive compositions include cadmium sulfide, cadmium selenide, cadmium sulfoselenide, zinc oxide, zinc sulfide, sulfur, selenium, antimony sulfide, lead oxide, lead sulfide, arsenic sulfide, arsenic selenium, alloys and mixtures thereof. The imaging suspension may contain one or more of the above different photosensitive materials in any suitable form each having similar or various ranges of spectral response.

As stated above, any suitable particle structure may be used in the course of the present invention. When the system is to be used in conjunction with a monochromatic imaging process then the imaging suspension will contain a plurality of pigment particles which are photoelectrophoretically sensitive to the exposure radiation. In the case of a polychromatic system, the suspension will contain a plurality of at least two differently colored photosensitive particles with the principal light absorption band of the photosensitive pigment component substantially coinciding with its principal photosensitive response. In the situation where the particle comprises substantially a pure, photosensitive material, or a sensitized form thereof, the pigment portion will provide both the photosensitivity and the coloration property for the particle. However, the photosensitive particle may consist of at least a two component particle. A color particle comprising one or more bits of a suitable photoconductor surrounded by a layer or coating of dyed gelatin or similar material may be utilized. Typical photoconductive materials include selenium, zinc oxide, cadmium sulfide, cadmium telluride, anthracene and sulphur. The dyed layer may consist of any suitable dye in gelatin, wax, vinyl or silicon resin, cellulose ester or similar material. The powdered photoconductor may be mixed with the dyed layer material or may be embedded in the surface of the dyed material. The photosensitive particle may comprise a central core consisting of a clear, transparent glass or plastic bead material carrying a transparent photoconductive layer and an outer, dyed, transparent coating. The outer layer accordingly may act as a filter layer to one of the primary colors of the electromagnetic radiation spectrum. In all instances the multiple layers may be formed by a spray-drying procedure or where appropriate the photoconductive material may be evaporated onto the core material. The pigment particle may comprise an inner capsule containing a liquid dye capable of being ruptured to release the dye constituent. When a liquid dye is used in combination with the filter layer the dye may consist of a color complimentary to that of the filter layer.

A wide range of voltages may be applied between the electrodes in the system. For good image resolution, high image density and low background it is preferred that the potential applied be such as to create an electric field of at least about 300 volts per mil across the imaging suspension. For example, when the imaging suspension is coated to a thickness of about 1 mil the electrode spacing will be such that an applied potential of about 300 volts produces a field across the suspension of about 300 volts per mil. Potentials as high as 8,000 volts have been applied to produce images of high quality. As is apparent the applied potential necessary to obtain the desired field of strength will vary depending upon the interelectrode gap as well as the type and thickness of the blocking material utilized.

Although various electrode spacings may be employed, spacings of less than 1 mil and extending down even to the point where the electrodes are pressed together as in the case of the roller electrode of FIG. 2 constitute a particularly preferred form of the invention in that they produce better resolution and superior color separation results than is produced with wider spacings. This improvement is believed to take place because of the high field strength across the suspension during imaging.

The following illustrative examples of preferred embodiments are given to enable those skilled in the art to more clearly understand and practice the invention.

EXAMPLES

All of the following examples are carried out in an apparatus of the general type illustrated in FIG. 2 with the imaging mix 14 coated on a NESA glass substrate through which exposure is made. The NESA glass surface is connected in series with a switch, a potential source, and the conductive center of a roller having a blocking electrode coating of baryta paper on its surface except where otherwise indicated. The roller is approximately 2½" in diameter and is moved across the plate surface at about 1.45 centimeters per second. The plate employed is roughly 3" square and is exposed with a light intensity of 1800 foot candles. Unless otherwise indicated, 7% by weight of the indicated particle in each example is suspended in Sohio odorless solvent 3440 and the magnitude of the applied potential is 2500 volts. The exposure is made with a 3200K lamp through a 0.30 neutral density step wedge filter to measure the sensitivity of the suspension to white light and then Wratten filters 29, 61 and 47b are individually superimposed over the light source in separate runs to measure the sensitivity of the suspensions to red, green, and blue light respectively for the particles in Examples II, XV and XXIX.

The relative sensitivity given for the suspensions is derived from the number of steps of the step wedge filter which are discernible in the images made through this filter. All of the examples are tested with a continuous tone subject and all so tested produce good quality images with both types of subject, with varying sensitivity as indicated.

| Example No. | Particle | Sensitivity |
| --- | --- | --- |
| I | Locarno Red, C.I. No. 15865, 1-(4'-methyl-5'-chloroazobenzene-2'-sulfonic acid)-2-hydroxy-3-naphthoic acid. | Very high. |
| II | Watchung Red B, a barium salt of 1-(4'-methyl-5'-chloroazobenzene-2'-sulfonic acid)-2-hydroxy-3-naphthoic acid, C.I. No. 15865. | Do. |
| III | Permagen Red L Toner, C.I. No. 15865, 1-(4'-methyl-5'-chloroazobenzene-2'-sulfonic acid)-2-hydroxy-3-naphthoic acid. | Extremely high. |
| IV | Naphthol Red B, C.I. No. 12355, 1-(2' methoxy-5'-nitrophenylazo)-2-hydroxy-3"-nitro-3-naphthanilide. | High. |
| V | Duol Carmine, the calcium lake of 1-(4'-methylazobenzene-2'-sulfonic acid)-2-hydroxy-3-naphthoic acid, C.I. No. 15850. | Extremely high. |
| VI | Bonadur Red B, C.I. No. 15865 | Do. |
| VII | Calcium Lithol Red, C.I. No. 15630 | High. |
| VIII | 2,9-dimethylquinacridone | Extremely high. |
| IX | Indofast Brilliant Scarlet Toner, C.I. No. 71140. | Do. |
| X | Dichloro thioindigo | High. |
| XI | Vulcan Fast Red Toner, C.I. No 21200 | Do. |
| XII | Pyrazolone Red B. Toner, C.I. No. 21120 | Do. |
| XIII | Cyan Blue GTNF (beta-copper phthalocyanine). | Very high. |
| XIV | Cyan Blue XR (alpha-copper phthalocyanine). | Do. |
| XV | Monolite Fast Blue G.S. (alpha metal-free phthalocyanine). | Extremely high. |
| XVI | Monolite Fast Blue G.S. (Cellophane blocking electrode). | Do. |
| XVII | Monolite Fast Blue G.S. (Cellulose acetate blocking electrode). | Do. |
| XVIII | Monolite Fast Blue G.S. (Polyethylene blocking electrode). | Do. |
| XIX | Monolite Fast Blue G.S. (Polyvinyl fluoride blocking electrode). | Do. |
| XX | Monolite Fast Blue G.S. (Polystyrene blocking electrode). | Do. |
| XXI | Monolite Fast Blue G.S. (Polytetrafluoroethylene blocking electrode). | Do. |
| XXII | Monolite Fast Blue G.S. (Polyethylene terephthalate blocking electrode). | Do. |
| XXIII | Beta metal-free phthalocyanine | Do. |
| XXIV | Methyl Violet, C.I. No. 42535 | Moderate. |
| XXV | Indofast Violet Lake, C.I. No. 60010 | High. |
| XXVI | Diane Blue, C.I. 21180 | Moderate. |
| XXVII | Polychloro substituted copper phthalocyanine. | Very high. |
| XXVIII | Indanthrene Brilliant Orange C.I. No. 59300. | Do. |
| XXIX | Algol Yellow G.C. C.I. No. 67300 | High. |
| XXX | Indofast Yellow Toner, C.I. No. 70600 | Very high. |
| XXXI | Indofast Orange Toner, C.I. No. 71105 | Do. |
| XXXII | Cadmium selenide, C.I. No. 77196 | Extremely high. |
| XXXIII | 1-cyano-2,3-Phthaloyl-7,8 benzopyrrocoline. | High. |

EXAMPLES XXXIV–XLI

A suspension including equal amounts of Watchung Red B, Algol Yellow G. C. and Monolite Fast Blue G. S. is made up in Sohio solvent with total pigment constituting approximately 7% by weight. These particles are magenta, yellow and cyan respectively. This mixture, known as trimix, is coated on a NESA glass substrate and exposed under the same conditions as described above in connection with Example I except that a Kodachrome color transparency is placed between the light source and the NESA glass substrate so that a colored image is projected onto this trimix as the roller moves across the surface of the glass. Here again, a baryta paper blocking electrode surface is employed and the roller is held at a negative potential of 2500 volts with respective substrate. After the roller passes over the substrate an excellent quality subtractive three-color image is left behind on the glass. This procedure is repeated using cellophane, cellulose acetate and polyethylene coated papers, polyvinyl fluoride, polystyrene, polytetrafluoroethylene and polyethylene terephthalates as blocking electrode surfaces in place of the baryta paper in Examples XXX–XLI, respectively. All these materials produce good quality images using this same trimix suspension.

EXAMPLE XLII

Particles made by spray drying a solution of 20 grams of Union Carbide CKM phenolic resin, 2 grams of 2,4,7- trinitro-9-fluorenenone, 3 grams of benzanthracene, 7,12-dione and one gram of Floural 7GA dye in 180 grams of acetone is suspended in a Sohio odorless solvent 3440 and is imaged according to the procedure of Example I. Sensitivity is low.

EXAMPLES XLIII–XLVI

Four different types of particles are made up according to the following compositions. Example XLIII contains one gram of "Araldite" epoxy resin to .25 gram of 2,4,7-trinitro fluorenone and .02 gram of Rhodamine B base dye. Example XLIV particles consist of one gram of CKM phenolic resin, .25 gram of 2,4,7-trinitrofluorenone to .02 gram of Rhodamine B base dye. Example XLV particles consist of one gram of phenoxy PKDA 8500 resin from Union Carbide to 0.25 gram of 2,4,7-trinitro fluorenone and .02 gram of Martius yellow dye. Example XLVI particles consist of one gram of phenoxy PKDA 8500 resin from Union Carbide, .25 gram of 2,4,7-trinitro fluorenone and .02 gram of Rhodamine B base dye. All particles are suspended in Sohio odorless solvent and imaged according to the procedure of Example I except that 8,000 foot candles is used for Examples XLV and XLVI. All examples produce images, however, Examples XLIII and XLVI are markedly more sensitive than Examples XLV and XLVI.

EXAMPLES XLVII–LII

In these examples the particles are imaged according to the procedure of Example I using the following material to make up the particles in each of the examples; in Example XLVII the particles are made up of eight parts by weight of zinc oxide to one part by weight of dimethylpolysiloxane resin. In Example XLVIII, Example XLVII particles are used except they are dye sensitized with .03 part by weight of Rose Bengal dye. In Example XLIX the particles consist of eight parts by weight of cadmium sulfide dispersed in one part by weight of an epoxy resin made by condensing Bisphenol A with epychlorohydrin. In Example L the particles consist of six parts by weight of the alpha crystalline form of metal-free phthalocyanine dispersed in one part by weight of an epoxy phenolic resin. In Example LI the particles consist of six parts by weight of the phthalocyanine of Example L dispersed by one part by weight of polymethylmethacrylate. In Example LII the particles consist of six parts by weight of alpha metal-free phthalocyanine in one part by weight of a styrene-acrylonitrile copolymer. All particles form an image when suspended and imaged according to the procedure of Example I; however, the particles containing phthalocyanine in Examples L–LII have the highest sensitivity followed by the cadmium sulfide particles of Example XLIX, the dye sensitized zinc oxide particles of Example XLVIII and the unsensitized zinc oxide particles of Example XLVII.

EXAMPLE LIII

Particles each made up of a core of 10% by weight of Carbon Black dispersed in an 87/13 copolymer of vinyl chloride and vinyl acetate are coated with a solid solution of ten parts by weight of unmodified unreactive phenolformaldehyde resin and 4 parts by weight of 2,4,7-trinitro-9-fluorenone. These particles when suspended at 7% by weight in Sohio and imaged according to the procedure of Example I form a good black and white transparency on the NESA glass.

EXAMPLE LIV

Particles made up of a core comprising 18 parts of a styrene-n-butyl methacrylate copolymer, 2 parts carbon black pigment and 2 parts of a polyvinyl butyral resin having randomly embedded therein 2 parts of phthalocyanine pigment are suspended at 7% by weight in Sohio and imaged according to the procedures of Example I to form a black and white transparency on the NESA glass.

Although the present examples are specific in terms of conditions and materials used, any of the above similar materials may be substituted when suitable with similar results. In addition to the steps used to carry out the process of the present invention, other steps or modifications may be used if desirable. In addition, other materials may be incorporated in the imaging suspension and the photosensitive particles and modifications made to the electrodes which will enhance, synergize or otherwise desirably effect the properties of the present invention. For example, sensitizers may be incorporated in the photosensitive particles and imaging suspension to effect spectral response.

Those skilled in the art will have other modifications occur to them based on the teachings of the present invention. These modifications are intended to be encompassed within the scope of the present invention.

What is claimed is:

1. The method of photoelectrophoretic imaging comprising subjecting an up to about one mil layer of a suspension to an applied electric field between at least two electrodes, at least one of which is a blocking electrode, said electric field having a field strength of at least about 300 volts per mil, said suspension comprising finely divided electrically photosensitive particles in an insulating carrier liquid at least a portion of said particles being selected from the group consisting of particles of an electrically photosensitive material dispersed in a resin, particles of an electrically photosensitive core overcoated with a resin, and particles of an electrically photosensitive material in solid solution with a resin, and exposing said suspension to a pattern of radiation until an image is formed.

2. The method of claim 1 wherein said resin is dyed.

3. The method of photoelectrophoretic imaging comprising subjecting an up to about one mil layer of a suspension to an applied electric field between at least two electrodes, at least one of which is a blocking electrode, said electric field having a field strength of at least about 300 volts per mil, said suspension comprising finely divided electrically photosensitive particles in an insulating carrier liquid, at least a portion of said particles comprising a core overcoated with an electrically photosensitive material, and exposing said suspension to a pattern of radiation until an image is formed.

4. The method of claim 3 wherein said core is electrically photosensitive.

5. The method of claim 3 wherein said electrically photosensitive material is coated with a dyed filter layer.

6. The method of claim 5 wherein said core comprises a liquid of a color complementary to said filter layer.

References Cited

UNITED STATES PATENTS

| | | | |
|---|---|---|---|
| 3,384,565 | 5/1968 | Tulagm et al. | 204—181 |
| 3,384,566 | 5/1968 | Clark | 204—181 |
| 2,940,847 | 6/1960 | Kaprelian | 96—1.2 |

GEORGE F. LESMES, Primary Examiner

J. C. COOPER III, Assistant Examiner

U.S. Cl. X.R.

96—1.2, 1.3, 1.5; 117—100 A, 100 B, 100 C; 204—181